United States Patent Office 2,713,568
Patented July 19, 1955

2,713,568

STRIPPING VINYLIDENE-VINYL CHLORIDE CO-POLYMERS WITH AID OF ALKYL ACRYLATE AND PRODUCT

Thomas W. Fisher, Jr., Elverson, and George P. Rowland, Jr., Pottstown, Pa., assignors to The Firestone Tire & Rubber Company, Akron, Ohio, a corporation of Ohio No Drawing. Application March 4, 1953,
Serial No. 340,376

8 Claims. (Cl. 260—45.5)

This invention relates to the copolymerization of major proportions of vinylidene chloride with minor proportions of cinyl chloride to yield crystalline resins having improved extrusion properties.

Filaments melt-extruded from conventional crystalline copolymers of vinylidene chloride with minor proportions of vinyl chloride frequently exhibit a surface roughness which greatly detracts from their appearance and utility. Investigations by the present patentees reveal that this roughness is due to minute local regions on the surface of the filament which contain unduly large proportions of vinylidene chloride polymerized therein. These regions, consisting of homopolymers of vinylidene chloride and/or copolymers of vinylidene chloride and vinyl chloride containing unduly high proportions of vinylidene chloride copolymerized therein, are insoluble in the general body of the vinylidene chloride-vinyl chloride copolymer, and so present discontinuities therein which show up as the surface roughness referred to. It further appears from these investigations that these discontinuities are due to polymeric material produced during the conventional step of stripping the unreacted monomers from these copolymers at the close of the copolymerization reaction. In this step, the copolymer, still containing unpolymerized monomeric vinylidene chloride and vinyl chloride, is heated and subjected to vacuum to remove the monomers. It appears that the vinyl chloride, being the more volatile, is removed first, temporarily leaving behind the vinylidene chloride. This vinylidene chloride monomer continues to polymerize, giving rise to areas in the resin which contain excessive amounts of vinylidene chloride polymerized therein and which produce the surface roughness of the filaments extruded from the resin.

Accordingly, it is an object of this invention to provide crystalline resinous copolymers of vinylidene chloride with vinyl chloride which may be extruded to yield filaments free from surface roughness.

Another object of this invention is to provide such resins which will be free from local regions containing excessive proportions of vinylidene chloride polymerized therein.

A further object is to provide a process of stripping the monomers from copolymers of vinyl chloride and vinylidene chloride which will avoid the formation of such regions containing excessive proportions of vinylidene chloride polymerized therein.

SYNOPSIS OF THE INVENTION

In accordance with this invention, a small amount of an alkyl acrylate is introduced into a crystalline copolymer of vinylidene chloride with vinyl chloride at a point in the manufacture thereof just in advance of the stripping of the monomers therefrom. Methyl acrylate is the preferred acrylate ester for this purpose, as it is cheap and readily available; however any of the acrylates of aliphatic alcohols containing up to six carbons in the alkyl groups thereof may be used in the practice of this invention. The copolymer is then subjected to the stripping operation. During the stripping, the alkyl acrylate, being of approximately the same, or of even less, volatility compared to the vinylidene chloride, lags behind along with the vinylidene chloride, and is not stripped out until the vinyidene chloride is also stripped out. Any polymerization of the as-yet-unstripped vinylidene chloride therefore occurs only in the presence of the alkyl acrylate so that, instead of a polymeric material containing unduly high percentages of vinylidene chloride polymerized therein, there is formed a copolymer of vinylidene chloride with methyl acrylate. This latter material is readily assimilable into the main body of the vinylidene chloride-vinyl chloride polymer, and does not produce surface roughness in filaments extruded threfrom. Continued stripping of the resin ultimately removes both the vinylidene chloride and methyl acrylate, but at no time during the stripping is the vinylidene chloride left behind to polymerize alone to produce regions containing undue concentrations of this monomer copolymerized therein.

THE CRYSTALLINE VINYLIDENE CHLORIDE-VINYL CHLORIDE COPOLYMERS

These are crystalline resins produced by copolymerizing from about 80% to about 95% of vinylidene chloride with from about 20% to 5% of vinyl chloride, the percentages being on the basis of the total weight of the vinylidene chloride and vinyl chloride in the mixture. Such resins are produced by subjecting mixtures of these two monomers to polymerizing conditions, either in solution in inert solvents, in aqueous emulsion or in aqueous suspension. This last method is preferred, and consists in agitating the liquid monomer with at least an approximately equal volume of an aqueous medium. (There is no theoretical upper limit to the amount of aqueous medium.) The aqueous medium usually contains a non-micelle-forming emulsifying agent such as gelatin, starch, polyvinyl alcohol or the like, which facilitates breaking up the monomer into small droplets suspended in the aqueous medium. There will usually be employed a catalyst which is soluble in the monomer phase, such as benzoyl peroxide, acetyl peroxide, peracetic acid, lauroyl peroxide, tert-butyl hydroperoxide and the like, such catalysts being characterized generally as oil-soluble free-radical-generating catalysts. The temperature during polymerization will usually be between about 40° C. and about 90° C., or lower than this range if activated catalyst systems are employed. The polymerization will ordinarily be carried to a point at which from about 80% to 95% by weight of the monomers have entered the copolymer. It is at this point that polymerization conditions are usually discontinued and the resin subjected to reduced pressure and heat to strip off the unreacted monomers.

THE ADDITION OF ALKYL ACRYLATE

In accordance with this invention, a lower alkyl acrylate is mixed with the copolymerized mass after substantially the desired extent of polymerization has taken place (say 80% to 95% as above described) but before the copolymerized mass is subjected to the stripping treatment. Lower alkyl acrylates suitable for use in this invention include any alkyl acrylates in which the alkyl groups esterified with the acrylate radical contain from one to six carbon atoms. Examples of such acrylates are:

Table

Methyl acrylate
Ethyl acrylate
n-Propyl acrylate
Isopropyl acrylate
n-Butyl acrylate
t-Butyl acrylate
1-methyl propyl acrylate
n-Amyl acrylate
Isoamyl acrylate n-Hexyl acrylate
Acrylates of the mixed amyl alcohols produced as by-products in the hydrogenation of carbon monoxide in methanol synthesis
Mixtures of any of the foregoing acrylates Of all of the above acrylates, the methyl acrylate is preferred, since it is cheaply and readily available and has the most desirable polymerization and volatilization properties. Since the stripping is usually carried out in a vessel separate from the vessel in which the copolymerization takes place, the alkyl acrylate is most conveniently added to the stream of copolymer on its way to the stripping vessel, or is introduced directly into the stripping vessel either before, during or after introduction of the copolymer into the stripping vessel. The alkyl acrylate may also be added to the polymerization vessel itself, but this would be slightly less advantageous in that it would introduce the possibility of contaminating the next oncoming charge, and would necessitate purging of the charging line. As to the amount of alkyl acrylate to be employed, this will ordinarily vary from 0.25%, at which the resultant improvement of the resin will be noticeable, to 1.0%, above which additional improvement will not be noticeable. The cited percentages are on the basis of the original vinylidene chloride monomer charge, which charge in turn will be substantially equal to the weight of the as-yet-unpolymerized vinylidene chloride plus the vinylidene chloride which has become copolymerized into the resin product. Still greater proportions may be used, since there would be no theoretical upper limit to the amount of alkyl acrylate operative in this invention; however such excess would be wasteful, and the limit cited may be regarded as economic, though of course not technical.

THE STRIPPING STEP

This is effected by subjecting the solution, aqueous emulsion, or suspension copolymerization mass to temperatures in the range of 25° C. to 60° C., preferably under reduced pressures of 2 pounds per square inch absolute at the end of the stripping operation and with vigorous agitation. The alkyl acrylate must be thoroughly dispersed throughout the polymerized mass, so that vigorous agitation should be brought to bear at some point after the addition of the alkyl acrylate and before the stripping operation has progressed to any considerable extent.

With the foregoing general description in mind, there is given herewith a detailed specific example of the practice of this invention. All parts given are by weight.

*Example*

|  | Parts | Pounds |
|---|---|---|
| Vinylidene chloride | 85 | 1,572 |
| Vinyl chloride | 15 | 278 |
| Lauroyl peroxide | 0.75 | 13.9 |
| Gelatin (100 bloom, neutral) | 0.30 | 5.6 |
| Glycidyl phenyl ether | 0.75 | 13.9 |
| Sodium pyrophosphate | 0.50 | 9.2 |
| Water | 122.0 | 2,235 (269 gallons) |
| Methyl acrylate | 0.4 | 7.4 |

The equipment provided for this process comprised a 500-gallon closable pressure reaction vessel provided with a rotary anchor stirrer and with a thermostatically controlled heating and cooling jacket. The kettle was arranged to discharge into a closable 1000-gallon stripping autoclave which was provided with an anchor stirrer and a vacuum offtake line.

The gelatin, sodium pyrophosphate and 30 gallons of the water were charged into the reaction vessel and stirred with heating to 130° F. until the gelatin dissolved. The anchor stirrer was operated during this step and throughout the subsequent reaction. The lauroyl peroxide was dissolved in four gallons of the vinylidene chloride, and this solution, together with the glycidyl phenyl ether, was charged into the reaction vessel. The contents of the vessel were then made up to 198 gallons by the addition of further quantities of water, and the vessel sealed and evacuated to 20 inches of mercury absolute.

The remainder of the vinylidene chloride and the vinyl chloride were then charged into the reactor, the charging lines purged with 25 gallons of water, and the temperature set at 142° F. Polymerization set in and was continued until the pressure fell to 60 pounds per square inch gauge, which was 20 pounds less than 80 pounds per square inch gauge, the maximum pressure observed during the process.

The methyl acrylate was added to a stripping autoclave, and the polymerization batch dropped from the polymerization reaction vessel to the stripping autoclave, the reaction vessel being flushed out with an additional 50 gallons of water. Stirring was commenced in the stripping vessel, and continued throughout the subsequent processing. The stripping vessel was evacuated to 26 inches of mercury absolute, which vacuum was maintained for one-half hour, the volatilized monomers being removed through the vacuum line. At the end of this time, the vacuum was broken, the charge diluted with an additional 270 gallons of water (not listed in the above recipe), dewatered on a filter, and dried. The resultant resin, when compounded with plasticizers and stabilizers known to the art and melt-extruded and oriented in the usual way, yielded filaments which were perfectly smooth and free from the roughness characterizing resins which were stripped of monomers without the use of methyl acrylate as above described.

From the foregoing general description and detailed specific example, it will be evident that this invention provides a method for the preparation of crystalline copolymers of vinylidene chloride with vinyl chloride which yield filaments free from roughness. The process is simple, and requires only the relatively inexpensive reactant, methyl acrylate.

What is claimed is:

1. Process of stripping a copolymerization mass containing (A) a crystalline resinous copolymer of 80–95% by weight vinylidene chloride, balance vinyl chloride plus (B) residual unpolymerized vinylidene chloride and vinyl chloride, the copolymerization reaction in said mass having proceeded to the extent that from 80% to 95% of the monomers therein have become polymerized, which process comprises admixing (C) an alkyl acrylate into said copolymerization mass and subjecting the mass to stripping conditions at a temperature from 25° C. to 60° C.

2. Process of stripping a copolymerization mass containing (A) a crystalline resinous copolymer of 80–95% by weight vinylidene chloride, balance vinyl chloride plus (B) residual unpolymerized vinylidene chloride and vinyl chloride, the copolymerization reaction in said mass having proceeded to the extent that from 80% to 95% of the monomers therein have become polymerized, which process comprises admixing (C) about 0.4% of methyl acrylate, based on the weight of original vinylidene chloride charged, into the copolymerization mass and subjecting the mass to stripping conditions at a temperature from 25° C. to 60° C.

3. Process of stripping a copolymerization mass containing (A) a crystalline resinous copolymer of 85% by weight vinylidene chloride, balance vinyl chloride plus (B) residual unpolymerized vinylidene chloride and vinyl chloride, the copolymerization reaction in said mass having proceeded to the extent that from 80% to 95% of the monomers therein have become polymerized, which process comprises admixing (C) methyl acrylate into said copolymerization mass and subjecting the mass to stripping conditions at a temperature from 25° C. to 60° C.

4. Process of stripping a suspension copolymerization mass comprising an aqueous suspension containing suspended therein (A) a crystalline resinous copolymer of 80–95% by weight vinylidene chloride, balance vinyl chloride plus (B) residual unpolymerized vinylidene chloride and vinyl chloride, the copolymerization reaction in said mass having proceeded to the extent that from 80% to 95% of the monomers therein have become polymerized, which process comprises admixing (C) methyl acrylate into said copolymerization mass and subjecting the mass to stripping conditions at a temperature from 25° C. to 60° C.

5. Process of stripping a copolymerization mass containing (A) a crystalline resinous copolymer of about 85% by weight vinylidene chloride, balance vinyl chloride plus (B) residual unpolymerized vinylidene chloride and vinyl chloride, the copolymerization reaction in said mass having proceeded to the extent that from 80% to 95% of the monomers therein have become polymerized, which process comprises admixing (C) methyl acrylate into said copolymerization mass and subjecting the mass to reduced pressure at temperatures from 25° C. to 60° C. to strip off said residual unpolymerized vinylidene chloride and vinyl chloride.

6. Process of stripping a suspension copolymerization mass comprising an aqueous suspension containing suspended therein (A) a crystalline resinous copolymer of about 85% by weight vinylidene chloride, balance vinyl chloride plus (B) residual unpolymerized vinylidene chloride and vinyl chloride, the copolymerization reaction in said mass having proceeded to the extent that from 80% to 95% of the monomers therein have become polymerized, which process comprises admixing methyl acrylate into said copolymerization mass and subjecting the mass to reduced pressure at temperatures from 25° C. to 60° C. to strip off said residual unpolymerized vinylidene chloride and vinyl chloride.

7. A smoothly extrudable crystalline resinous copolymeric composition consisting chiefly of a copolymer of 80–95% by weight of vinylidene chloride, balance vinyl chloride, together with small proportions of copolymers of vinylidene chloride with an alkyl acrylate and with an alkyl acrylate and vinyl chloride, said copolymeric composition having been produced by the process of claim 1.

8. A smoothly extrudable crystalline resinous copolymeric composition consisting chiefly of a copolymer of about 85% by weight of vinylidene chloride, balance vinyl chloride, together with small proportions of copolymers of vinylidene chloride with methyl acrylate and with methyl acrylate and vinyl chloride, said copolymeric composition having been produced by the process of claim 6.

References Cited in the file of this patent

UNITED STATES PATENTS

| | | |
|---|---|---|
| 2,636,870 | Conners | Apr. 28, 1953 |
| 2,640,050 | Le Fevre et al. | May 26, 1953 |

FOREIGN PATENTS

| | | |
|---|---|---|
| 999,594 | France | Oct. 3, 1951 |